United States Patent [19]

Stone

[11] Patent Number: 5,068,994
[45] Date of Patent: Dec. 3, 1991

[54] FOOTROPE CONSTRUCTION FOR A BOTTOM TRAWL

[75] Inventor: Michael Stone, Edmonds, Wash.
[73] Assignee: Gourock Pacific, Inc., Seattle, Wash.
[21] Appl. No.: 454,995
[22] Filed: Dec. 22, 1989
[51] Int. Cl.$^5$ .............................................. A01K 73/02
[52] U.S. Cl. ..................................................... 43/9.9
[58] Field of Search ............................ 43/9.2, 9.8, 9.9

[56] References Cited

U.S. PATENT DOCUMENTS 4,349,972  9/1982  Bruce, Jr. et al. ..................... 43/9.9

FOREIGN PATENT DOCUMENTS

| 0043998 | 4/1931 | Denmark | 43/9.9 |
|---|---|---|---|
| 0007260 | 8/1894 | United Kingdom | 43/9.9 |
| 0010922 | 12/1905 | United Kingdom | 43/9.9 |
| 0024768 | 6/1906 | United Kingdom | 43/9.9 |
| 0349871 | 6/1931 | United Kingdom | 43/9.9 |

*Primary Examiner*—Kurt Rowan
*Attorney, Agent, or Firm*—Fleit, Jacobson, Cohn, Price, Holman & Stern

[57] ABSTRACT

There is disclosed a footrope construction for use with a bottom trawl generally comprising a conical net having side wings to herd fish into the mouth of the net, flotation devices attached to the upper part of the mouth of the net to provide hydrodynamic lift, and wire ropes attached to the side wings of the net and adapted to be attached to a vessel to spread the net horizontally. The footrope construction comprises a series of rubber straps maintained substantially in the vertical at a specific vessel speed, thus allowing the strap to lightly contact the ocean bottom and create a mudcloud which will provide a visible deterrent for the regular fish entering the wings of the trawl to escape under the net while passing over the shellfish without causing damage and without capturing them in the net.

3 Claims, 2 Drawing Sheets

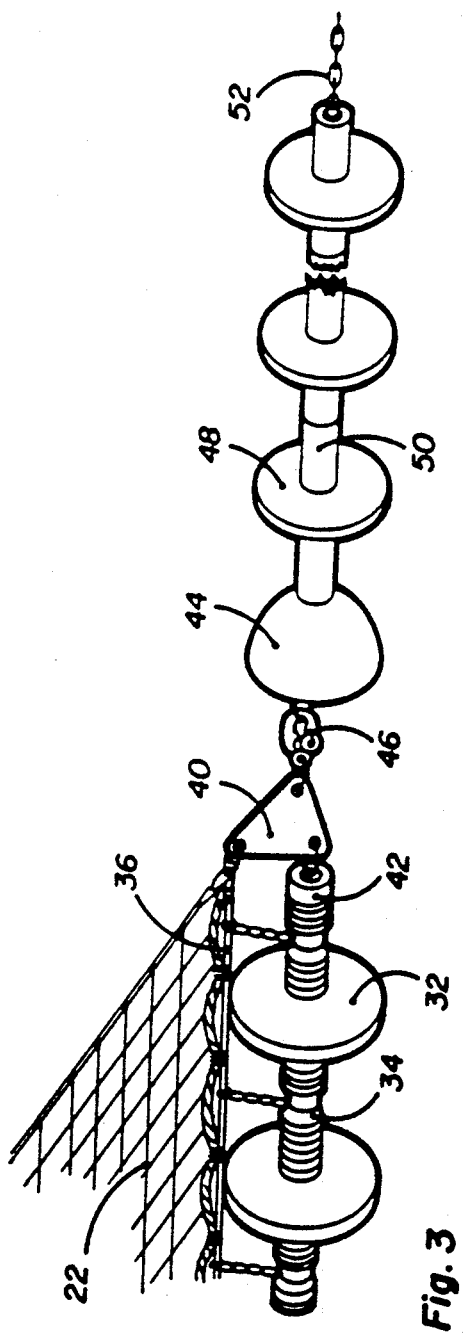
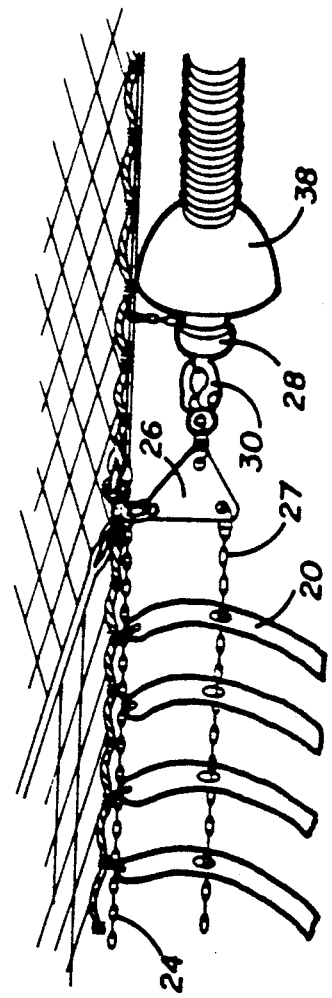
Fig. 3
Fig. 4

FOOTROPE CONSTRUCTION FOR A BOTTOM TRAWL

This invention relates to a footrope construction for a bottom trawl which is designed for reducing bycatch of shellfish.

A conventional bottom trawl uses a conical net having side wings to herd the fish into the mouth of the net. The net is held open vertically by flotation devices, or in some cases kites provide hydrodynamic lift. Otterboards attached to long bridles of wire rope spread the net horizontally. In order for the net to remain in contact with the seabed, the bottom of the trawl is fitted with a footrope, generally of chain, covered with a combination of rubber discs, and rubber or steel bobbins. The net raises above this footrope, but is fixed to it by means of dropper chains or traveler wires. The footrope is generally 1 to 2 feet below the net body.

One problem encountered with conventional bottom trawls is the bycatch of shellfish, such as King Crab and Tanner Crab together with regular fish such as the Yellowfin sole. In order to reduce bycatch of crab, large mesh crab panels have been located in several trawl net designs behind the footrope. Observation with an ROV (remotely operated vehicle) showed that the majority of the sole go over the crab panels while the crab pass through the large mesh. The catch counts showed that the crab panels significantly lower the catch of crab while at the same time decreasing the catch of sole. Because the panels reduce the catch of sole, they are generally used only when a trawl experiences increases in the amount of crab caught.

It is also known to use crab chutes between the net itself and the codend of the trawl. The sole generally pass over the crab chute into the codend while the crab enter it and pass through it to the ocean floor. However, some crab generally pass over the chute. Because the chute does not decrease the sole catch, they may be used all the time and do not have to be laced in and out as it is the case with crab panels.

It is the object of the present invention to provide a new footrope construction for use with conventional trawls and which reduces the bycatch of crab while avoiding the drawbacks of the previously used crab panels and chutes.

The footrope construction in accordance with the present invention comprises a series of rubber straps suspended from the bottom of the mouth of the net. The footrope construction is weighted to maintain the straps substantially in the vertical at a specific vessel speed, thus allowing the straps to lightly contact the ocean bottom and create a mudcloud which provides a visible deterrent for the regular fish entering the wings of the trawl to escape under the net while passing over the shell fish without causing damage and without capturing them in the net.

The footrope construction preferably comprises a first chain for holding the upper end of the straps, a second chain passing through the center of the straps and a weight associated with the second chain for maintaining the straps substantially vertical.

The invention will now be disclosed, by way of example, with reference to the accompanying drawings in which:

FIG. 3 is an enlarged view of the bunt wing portion of the trawl; and

FIG. 4 is an enlarged view of a portion of the footrope in accordance with the present invention.

Figure 1:
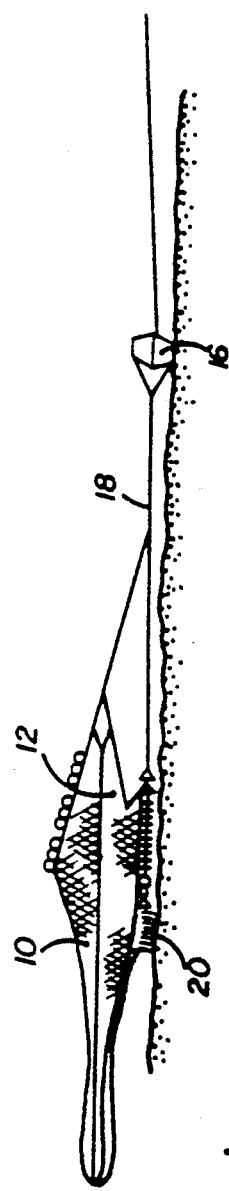
FIG. 1 is a side view of a trawl incorporating a footrope in accordance with the present invention.
Figure 2:
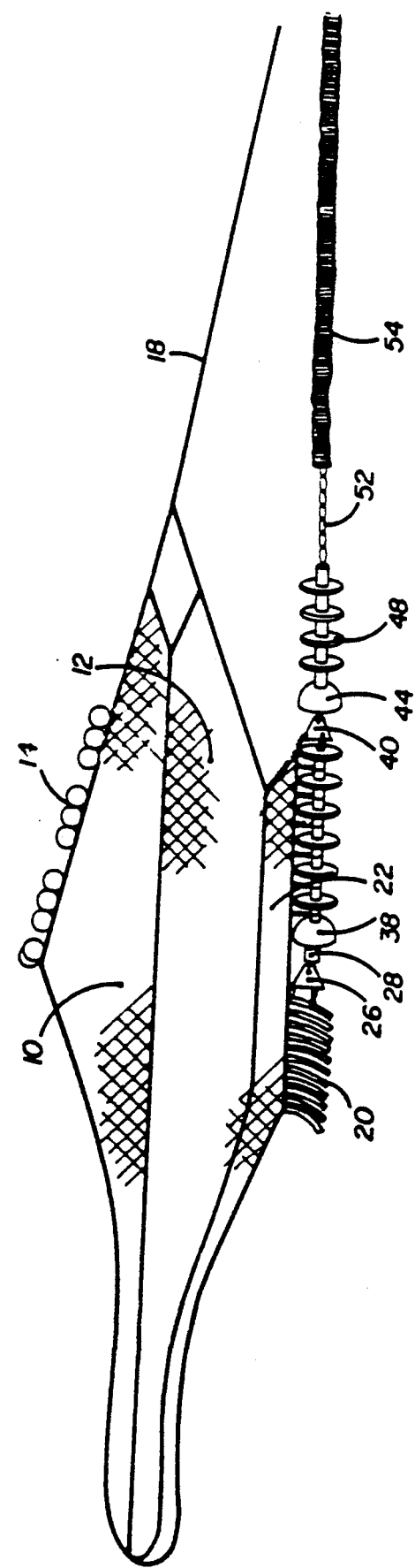
FIG. 2 is an enlarged view of the front portion of the trawl.

Referring to FIGS. 1 and 2 there is shown a bottom trawl generally comprising a conical net 10 having side wings 12 to herd fish into the mouth of the net. Floats 14 are attached to the upper part of the mouth of the net to provide hydrodynamic lift. Otterboards 16 attached to long bridles of wire rope 18 spread the net horizontally. The trawl net is provided with a special footrope rig using long rubber straps 20 suspended from the bottom of the trawl except in the bunt wing section 22. As illustrated in FIG. 4, the straps are suspended from a chain 24 which is attached to one corner of a delta member 26 which is itself attached at that corner to the bottom of the trawl. Another chain 27 passes through the straps and is attached to the second corner of delta member 26. The third corner of the delta member 26 is attached to a weight 28 through a swivel 30. The weight 28 is such as to maintain the straps substantially in the vertical position at a specific speed of the boat hauling the trawl, allowing these straps to lightly contact the ocean bottom. The theory is that these straps will provide a visible deterrent to escape for fish entering the wings of the trawl, as the straps will be highly visible, moving, and creating some mudcloud activity. The straps however will have much less friction on the seabed, and subsequently not dig into the mud or sand, causing unnatural damage to the marine environment. The shellfish, which move slowly along the bottom will be run over by the trawl, but the straps will simply pass over them without causing damage, and without capturing them in the netting.

The bunt wing section 22 of the trawl net is provided with a regular roller gear to stabilize the net and maintain ground contact. As shown more clearly in FIG. 3, the roller gear comprises a series of rubber discs 32 separated by spacers 34 which are suspended from the bunt wing section of the trawl through a wire rope 36. The series of rubber discs 32 are attached at one end to a large diameter bobbin 38 which is attached to the new footrope construction, and at the other end to one corner of another delta member 40 through a weigh 42. The second corner of delta member 40 is attached to the bunt wing section 22 and the third corner to another large diameter bobbin 44 through a swivel 46. Another series of rubber discs 48 spaced by polypropylene spacers 50 interconnect delta member 44 to a chain 52 which is attached to wire rope 18. Rubber discs 54 may be provided on chain 52 to help creating a mudcloud to herd the fish into the mouth of the net.

Although the invention has been disclosed with reference to a preferred embodiment, it is to be understood that the invention is not limited to such embodiment and that other alternatives are also envisaged within the scope of the following claims.

I claim:

1. A footrope construction for use with a bottom trawl generally comprising a conical net having side wings to herd fish into the mouth of the net, flotation devices attached to the upper part of the mouth of the net to provide hydrodynamic lift, and wire ropes attached to the side wings of the net horizontally, said footrope construction comprising a series of rubber straps suspended from the bottom of the mouth of the net and including means for maintaining the rubber straps substantially in the vertical at a specific vessel speed, thus allowing the lower end of the strap to lightly contact the ocean bottom and create a mudcloud which will provide a visible deterrent for the regular fish entering the wings of the trawl to escape under the net while passing over the shellfish without causing damage and without capturing them in the net.

2. A footrope construction as defined in claim 1, wherein said means for maintaining the rubber straps substantially in the vertical comprises a first chain attached to the bottom of the net for holding the upper end of the straps, a second chain passing through the center of the straps and a weight associated with the second chain for maintaining the straps substantially vertical.

3. A footrope construction for use with a bottom trawl generally comprising a conical net having side wings to herd fish into the mouth of the net, flotation devices attached to the upper part of the mouth of the net to provide hydrodynamic lift, and wire ropes attached to the side wings of the net horizontally, said footrope construction comprising a series of rubber straps maintained substantially in the vertical at a specific vessel speed, thus allowing the strap to lightly contact the ocean bottom and create a mudcloud which will provide a visible deterrent for the regular fish entering the wings of the trawl to escape under the net while passing over the shellfish without causing damage and without capturing them in the net, a first chain attached to the bottom of the net for holding the upper end of the straps, a second chain passing through the center of the straps, and a weight associated with the second chain for maintaining the straps substantially vertical.

* * * * *